US012491535B2

(12) United States Patent
Lamberton, Jr. et al.

(10) Patent No.: US 12,491,535 B2
(45) Date of Patent: Dec. 9, 2025

(54) BENT PAINT ROLLER WITH MAGNETIC SHIELD

(71) Applicant: SWIMC LLC, Cleveland, OH (US)

(72) Inventors: Michael C. Lamberton, Jr., Warrensville Heights, OH (US); Charles T. Buckel, Jr., Warrensville Heights, OH (US)

(73) Assignee: SWIMC LLC, Cleveland, OH (US)

( * ) Notice: Subject to any disclaimer, the term of this patent is extended or adjusted under 35 U.S.C. 154(b) by 310 days.

(21) Appl. No.: 17/912,595

(22) PCT Filed: Mar. 19, 2021

(86) PCT No.: PCT/US2021/023203
§ 371 (c)(1),
(2) Date: Sep. 19, 2022

(87) PCT Pub. No.: WO2021/188928
PCT Pub. Date: Sep. 23, 2021

(65) Prior Publication Data

US 2023/0173534 A1 Jun. 8, 2023

Related U.S. Application Data

(60) Provisional application No. 62/992,398, filed on Mar. 20, 2020.

(51) Int. Cl.
*B05C 17/02* (2006.01)

(52) U.S. Cl.
CPC ...... *B05C 17/0205* (2013.01); *B05C 17/0225* (2013.01)

(58) Field of Classification Search
CPC . B05C 17/0205; B05C 17/0225; A46B 13/08; B60S 1/68
See application file for complete search history.

(56) References Cited

U.S. PATENT DOCUMENTS 3,172,138 A * 3/1965 Price ........................ A47L 11/18 451/352
3,273,192 A * 9/1966 Mazzella .............. B05C 17/022 15/230.11

(Continued)

FOREIGN PATENT DOCUMENTS

FR 2881970 8/2006
FR 2881970 A1 * 8/2006 ......... B05C 17/0205

OTHER PUBLICATIONS

FR-2881970-A1—English Machine Translation (Year: 2006).*

(Continued)

*Primary Examiner* — Marc Carlson
(74) *Attorney, Agent, or Firm* — Tucker Ellis LLP

(57) ABSTRACT

Provided is a paint roller that may include a wire frame and a magnetic shield selectively attachable to the paint roller. The wire frame may comprise a configuration including multiple bends. In an embodiment, the wire frame may include a straight portion, a first bend, a second bend that directs the frame at a 180° angle relative to the straight portion, and a third bend that directs the wire frame at an angle less than the first and second bends. The bends and legs of the wire frame may be positioned in the same plane. The paint roller may further comprise a handle, a roller cage, and a roller cover. The magnetic shield may be selectively attachable to an end of the paint roller. The shield may include a generally circular shaped face that defines a circumference having a slightly smaller circumference than the circumference of the paint roller cover.

6 Claims, 12 Drawing Sheets

(56) References Cited

U.S. PATENT DOCUMENTS

| | | | | | |
|---|---|---|---|---|---|
| 3,408,676 | A | * | 11/1968 | Cayo | B05C 17/022 15/245 |
| 3,419,931 | A | * | 1/1969 | Willig | B05C 17/022 403/162 |
| 3,665,546 | A | * | 5/1972 | Horeni | B24B 23/02 15/97.1 |
| 4,038,716 | A | * | 8/1977 | Polsfuss | B05C 17/022 403/111 |
| 4,302,122 | A | * | 11/1981 | Moya | A46B 17/08 401/289 |
| 4,304,025 | A | * | 12/1981 | Christensen | B05C 17/02 15/230.11 |
| 4,528,714 | A | * | 7/1985 | Beck | B05C 17/022 492/11 |
| 4,599,762 | A | * | 7/1986 | Rigter | B05C 17/02 15/248.2 |
| 4,897,893 | A | | 2/1990 | Barker | |
| 5,105,500 | A | * | 4/1992 | Bordogna | B05C 17/02 15/230.11 |
| 5,715,562 | A | * | 2/1998 | Lowrey | B05C 17/022 15/230.11 |
| 5,870,795 | A | * | 2/1999 | Sizemore | B05C 17/0237 492/19 |
| D574,153 | S | * | 8/2008 | Dehart | D4/122 |
| D578,769 | S | * | 10/2008 | Patterson | D4/122 |
| D677,903 | S | * | 3/2013 | Boukair | D4/122 |
| 8,819,885 | B1 | * | 9/2014 | Boukair | B05C 17/0205 D4/122 |
| 8,819,886 | B1 | * | 9/2014 | Boukair | B05C 17/02 D4/122 |
| D773,827 | S | * | 12/2016 | Typrowicz | D4/122 |
| D845,000 | S | * | 4/2019 | Simpson | D4/122 |
| 10,583,813 | B2 | * | 3/2020 | Jarnagin | B60S 1/68 |
| D921,367 | S | * | 6/2021 | Buckel, Jr. | D4/122 |
| D953,749 | S | * | 6/2022 | Lambertson | D4/122 |
| D974,047 | S | * | 1/2023 | Buckel, Jr. | D4/122 |
| 2003/0217424 | A1 | * | 11/2003 | Stone | A46B 7/04 15/176.1 |
| 2009/0089952 | A1 | * | 4/2009 | Smith | B05C 17/02 15/230.11 |
| 2010/0024147 | A1 | * | 2/2010 | Watson | B05C 17/0205 15/230.11 |
| 2013/0340192 | A1 | * | 12/2013 | DeCarr | B05C 17/0227 15/230.11 |
| 2014/0013530 | A1 | * | 1/2014 | Gallardo | B05C 17/0207 15/230.11 |
| 2019/0118216 | A1 | * | 4/2019 | Bukovitz | B05C 17/02 |

OTHER PUBLICATIONS

Patent Cooperation Treaty (PCT), International Search Report and Written Opinion for Application PCT/US2021/023203 filed on Mar. 20, 2020, mailed Jun. 15, 2021, International Searching Authority, US.

* cited by examiner

BENT PAINT ROLLER WITH MAGNETIC SHIELD

CROSS REFERENCE TO RELATED APPLICATIONS

This application claims priority to and the benefit under 35 USC 371 of International Patent Application PCT/US2021/023203 filed on Mar. 20, 2020 which claims priority to Provisional Application No. 62/992,398 filed on Mar. 20, 2020 and entitled "BENT PAINT ROLLER WITH MAGNETIC SHIELD," which is are incorporated herein by reference in their entireties.

FIELD OF THE INVENTION

The present disclosure relates generally to paint applicators, and more specifically to roller frames and shields, for precision and ease in painting surfaces and for maintaining cleanliness of the roller apparatus.

BACKGROUND

When painting or staining a surface, such as a room, wall, piece of furniture, or other item, it is often desirable to contain the paint within a designated area or edge. As a result, painting or staining a surface often requires protecting areas that are not intended to be painted, such as a junction between a wall and ceiling, adjacent wall, floor, molding, outlets, or any surface not intended to be painted (with a particular color) that is adjacent to a surface that is intended to be painted (with that particular color). For example, two paint colors may be used on the walls of a room and ceiling, to provide an accent wall or design on a surface such as a wall or piece of furniture, and the like. Distinguishing between different intended paint areas or edging up against a junction is generally achieved through slow freehand painting or edging with a hand brush or small roller, using tarps to cover areas, or using painters tape. All of these methods, however, have associated problems such as increased time spent on projects, lack of precision in forming a straight line or in bleeding of the paint, poor angular and ergonomic reach and use of the brush or roller, inadequate protection of non-painted areas, and damage due to adhesive materials or scratching of the roller or brush edge. Some devices utilize a method that may create a gap between the paint area and area that should remain unpainted, but such a gap is not visually desirable and generally requires freehand painting of the gap later.

An improved paint applicator is needed that provides a user speed, adequate protection and precision, angular and ergonomic reach, and ease while painting, for example, walls near the ceiling or an adjacent wall.

SUMMARY

Provided herein is an improved paint roller device and paint shield device. In an embodiment, provided is a paint roller comprising a bent frame, wherein the paint roller comprises a handle, a frame extending from the handle and having at least four straight legs and at least three bends, and a roller cage attached to the frame and configured to optionally receive a roller cover. The frame may include a straight portion extending from the handle, a first bend and a second bend that together direct the frame to a position substantially parallel to and offset from the straight portion, and a third bend that directs the frame at an angle less than the first and second bends. The first and the second bends together may direct the straight portion of the frame to a position from between 175° and 185° relative to the straight portion. Further, the first and the second bends together may direct the straight portion of the frame to a position 180° relative to the straight portion. The first bend may direct the frame to an angle from between 85° and 95° relative to the straight portion and the second bend may direct the frame to an angle from between 85° and 95° relative to the preceding frame portion. The first bend may direct the frame into a first right angle and the second bend may direct the frame into a second right angle in a direction away from the handle. The third bend may be less than 45° and the straight portions and bends of the frame may be aligned along a single plane.

In another embodiment, provided is a paint roller comprising a bent frame, wherein the paint roller comprises a handle, with the frame extending from the handle and comprising a first leg extending from the handle to a first bend, a second leg extending from the first bend to a second bend, a third leg extending from the second bend to a third bend, a fourth leg extending from the third bend, and a roller cage attached to the fourth leg of the frame and configured to optionally receive a roller cover. The straight portions and bends of the frame may be aligned along a single plane. The third leg of the frame may be parallel to and offset from the first leg of the frame. The first bend and the second bend together may be equal to about 175° and 185°. The first bend may be between 85° and 95° and the second bend may be between 85° and 95°, wherein the third bend may have an angle less than each the first bend and the second bend, wherein the third bend may be less than 45°.

In another embodiment, provided is a shield configured to attach to a paint roller, wherein the shield comprises a circular and planar plate, a stem extending from the center of the plate, the stem including a magnet and a cavity wherein the shield is configured to selectively and magnetically attach to an end of a frame of a paint roller to assist with preventing paint from transferring onto an adjacent surface. The shield may be configured to selectively and magnetically attach to the frame of the paint roller of any embodiment of the bent frames disclosed herein. The plate comprises a surface that may be continuous and does not include any beveled edges or cut-outs. The plate may include a rounded peripheral edge. The plate may include a circumference that is less than the outer circumference of a roller cover. The stem may include a circumference that is less than the inner circumference of a roller cover.

BRIEF DESCRIPTION OF THE DRAWINGS

The present teachings may be better understood by reference to the following detailed description taken in connection with the following illustrations, wherein.

DETAILED DESCRIPTION

Figure 1:
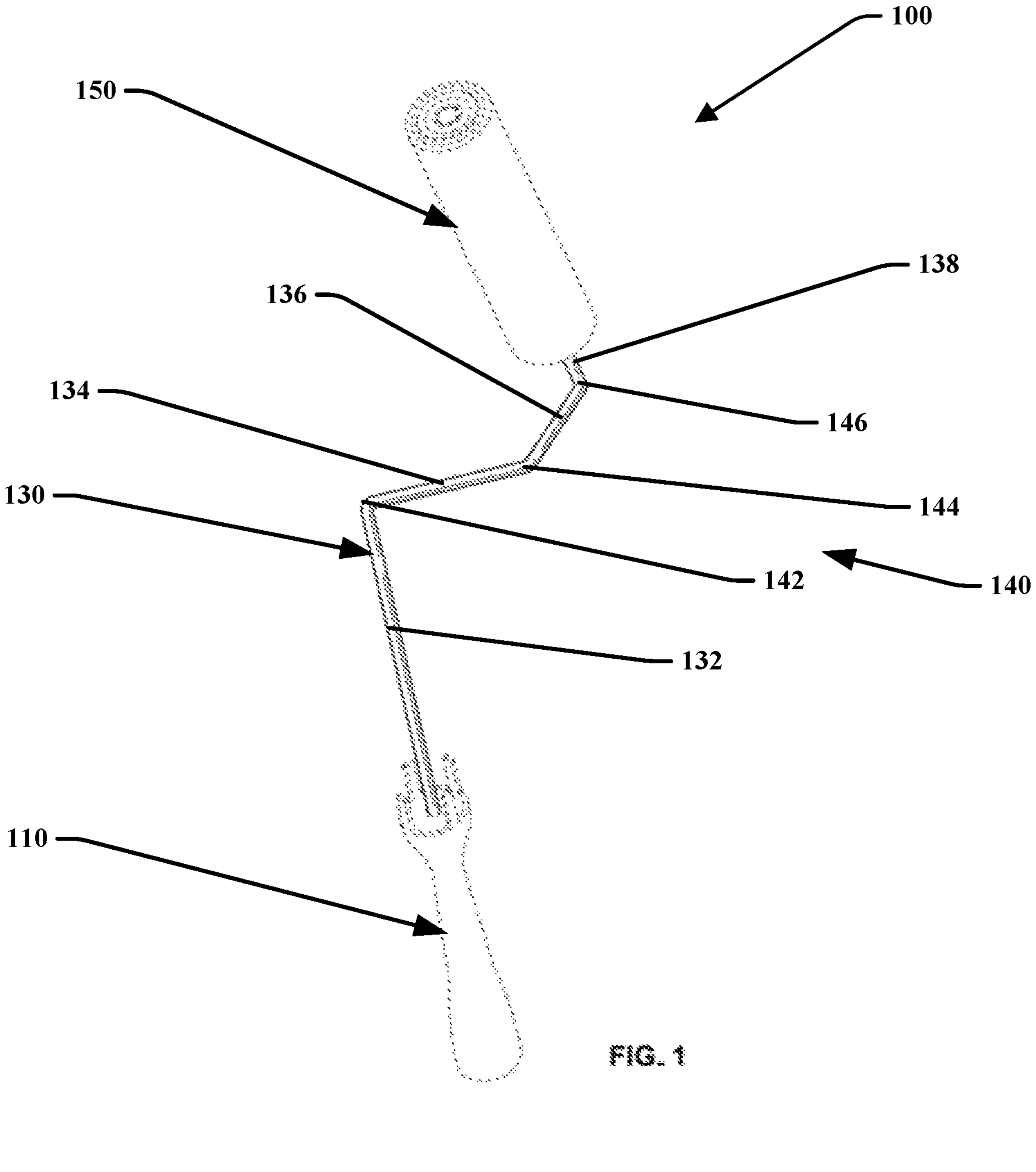
FIG. 1 is a perspective view of a paint roller having a bent frame in accordance with the present disclosure.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Further, unless context suggest otherwise, descriptions of shapes (e.g., circular, rectangular, triangular, etc.) refer to shapes meeting the definition of such shapes and general representation of such shapes. For instance, a triangular shape or generally triangular shape may include a shape that has three sides and three vertices or a shape that generally represents a triangle, such as a shape having three major sides that may or may not have straight edges, triangular like shapes with rounded vertices, etc. Also, any bends or angles as described herein may similarly include bends and angles with rounded vertices.

Provided is a paint roller that may include a wire frame and a magnetic shield selectively attachable to the paint roller. The paint roller and shield may facilitate the edging of paint without the need for tape, tarps, or imprecise freehand painting with a paint brush or edging tool. The wire frame may comprise a configuration of a continuous metal rod, that includes multiple straight portions and multiple bends of various angles to configure the handle at a desired position relative to the paint roller. In an embodiment, the wire frame may include a straight portion, a first bend, a second bend that directs the frame at about a 180° angle relative to the straight portion (and may be generally parallel and offset relative to the straight portion), and a third bend that directs the wire frame at an angle less than the first and second bends. In an embodiment, the third bend may be less than 45°. In an embodiment, the first, second, and third bends and associated legs of the wire frame may be positioned in a common plane of orientation. The paint roller may further comprise a handle, a roller cage, and a roller cover operatively attachable over the roller cage. The magnetic shield may be selectively attachable to an end of the paint roller. The shield may include a generally circular shaped face that defines a circumference having a slightly smaller circumference than a circumference of the paint roller cover.

The paint roller may provide a user speed, the protection of unpainted surfaces, precision in painting desired surfaces, angular and ergonomic reach, and ease while painting, for example, walls near a ceiling or an adjacent wall. In an embodiment, disclosed is a frame or neck with a bent orientation to assist in ergonomics and the angular reach of paint application by the paint roller. In an embodiment, disclosed is a shield that may be attached to different types of existing paint rollers or to a paint roller having a bent frame as described herein.

Figure 12:
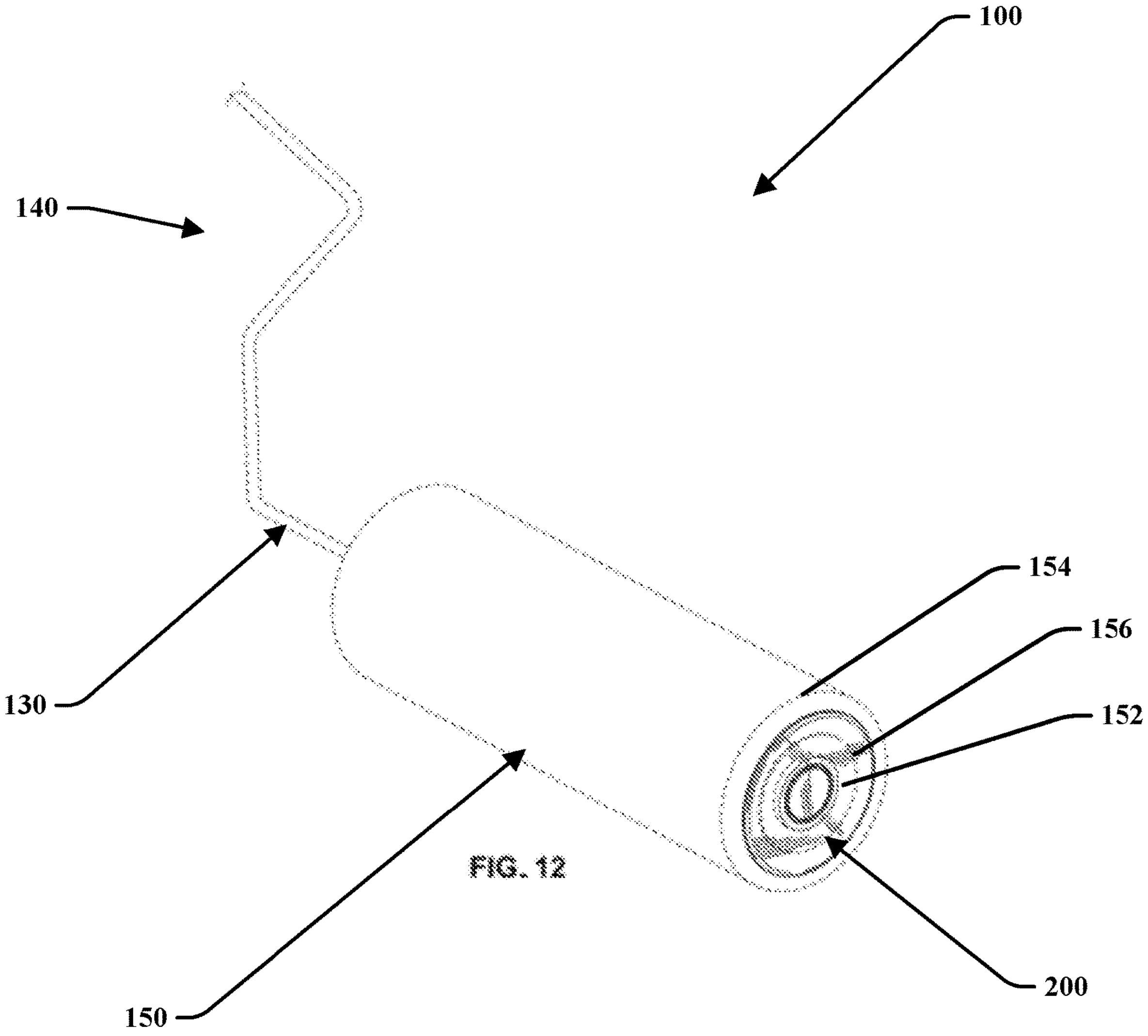
FIG. 12 is a perspective view of the shield coupled to a paint roller according to the present disclosure.
Figure 13:
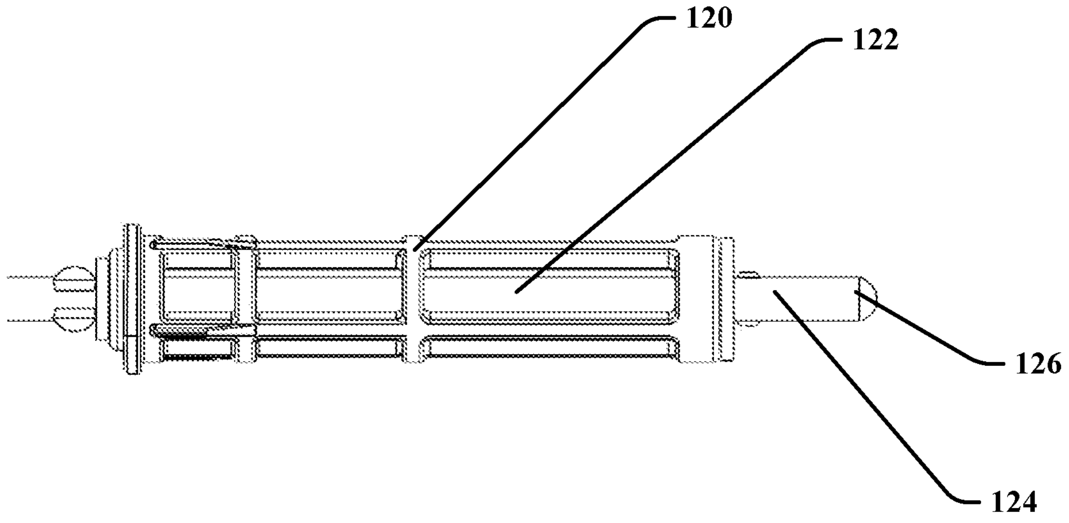
FIG. 13 is a side view of a portion of a paint roller according to the present disclosure.

FIGS. 1-7 and 12-14 depict various views of an embodiment of a paint roller 100. The paint roller 100 may comprise a handle 110, a roller cage 120 adapted to receive an optional roller cover 150, and a frame or neck 130. The handle 110 may be operatively coupled to or extend from a first end or first leg 132 of the frame 130. The roller cage 120 may be operatively coupled to or extend from a second end or fourth leg 138 of the frame 130. In an embodiment, the optional roller cover 150 may be positioned over the roller cage 120, see FIG. 13 depicting the roller cage 120 without an optional roller cover 150 and FIG. 1, for example, showing an optional roller cover 150 attached to and covering the roller cage 120. In an embodiment, the roller cage 120 may compress slightly so as to enable the roller cover 150 to be positioned over the roller cage 120, and the roller cage 120 may then extend slightly so as to secure the roller cover 150 in this position. In an embodiment, the roller cage 120 may include protrusions to removeably engage the optional roller cover 150 when it is attached. The roller cage 120 and the roller cover 150 may be configured to rotate concentrically about an axis. The roller cover 150 may be used to receive and apply paint to a surface, such as a wall, and may be comprised of foam, microfiber, pile fabric, or similar material. The roller cover 150 may absorb the paint and transfer the paint to a surface to be painted and be designed to be removeable from the roller cage 120.

Figure 2:
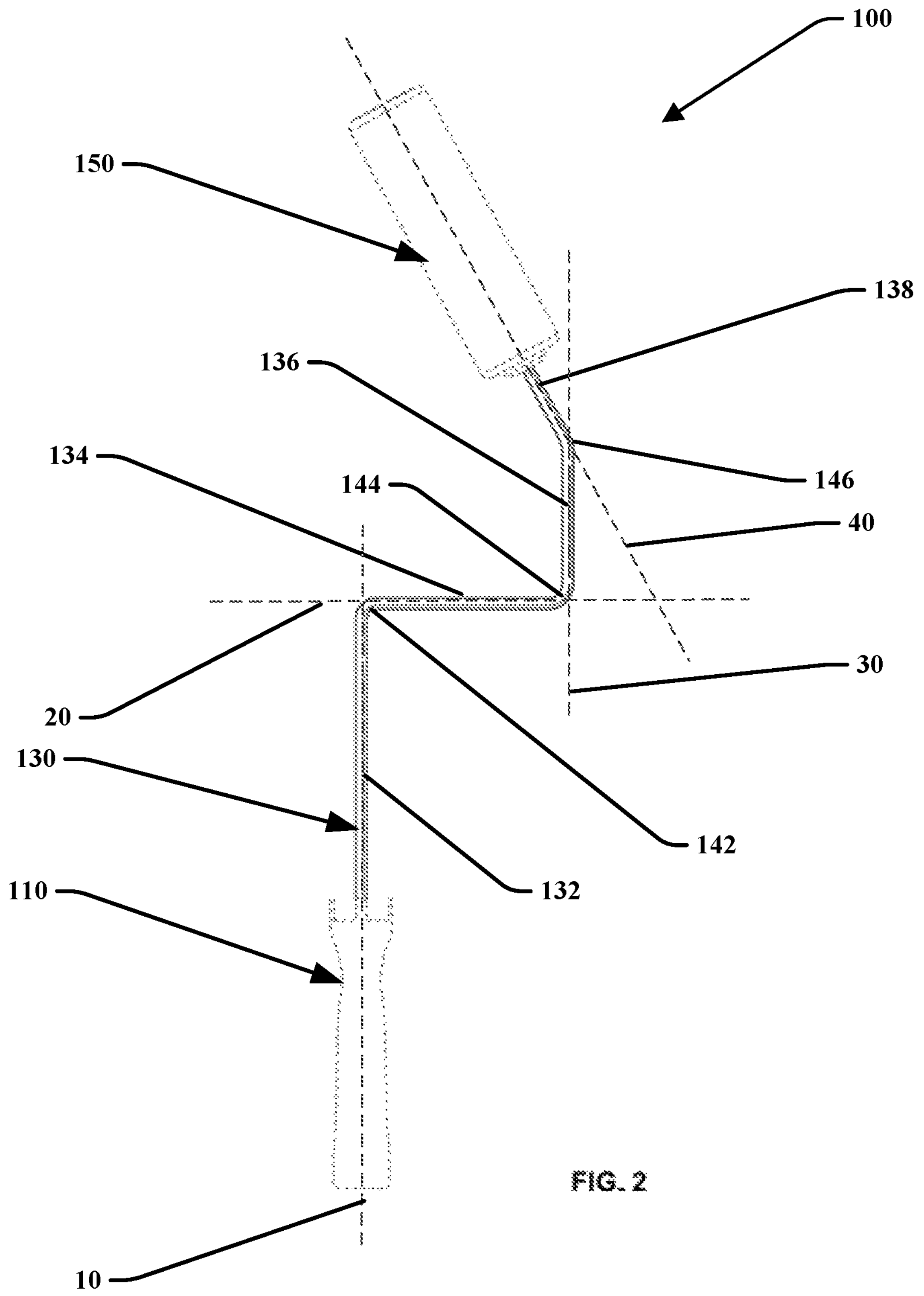
FIG. 2 is a front plan view of the paint roller having a bent frame of FIG. 1.
Figure 3:
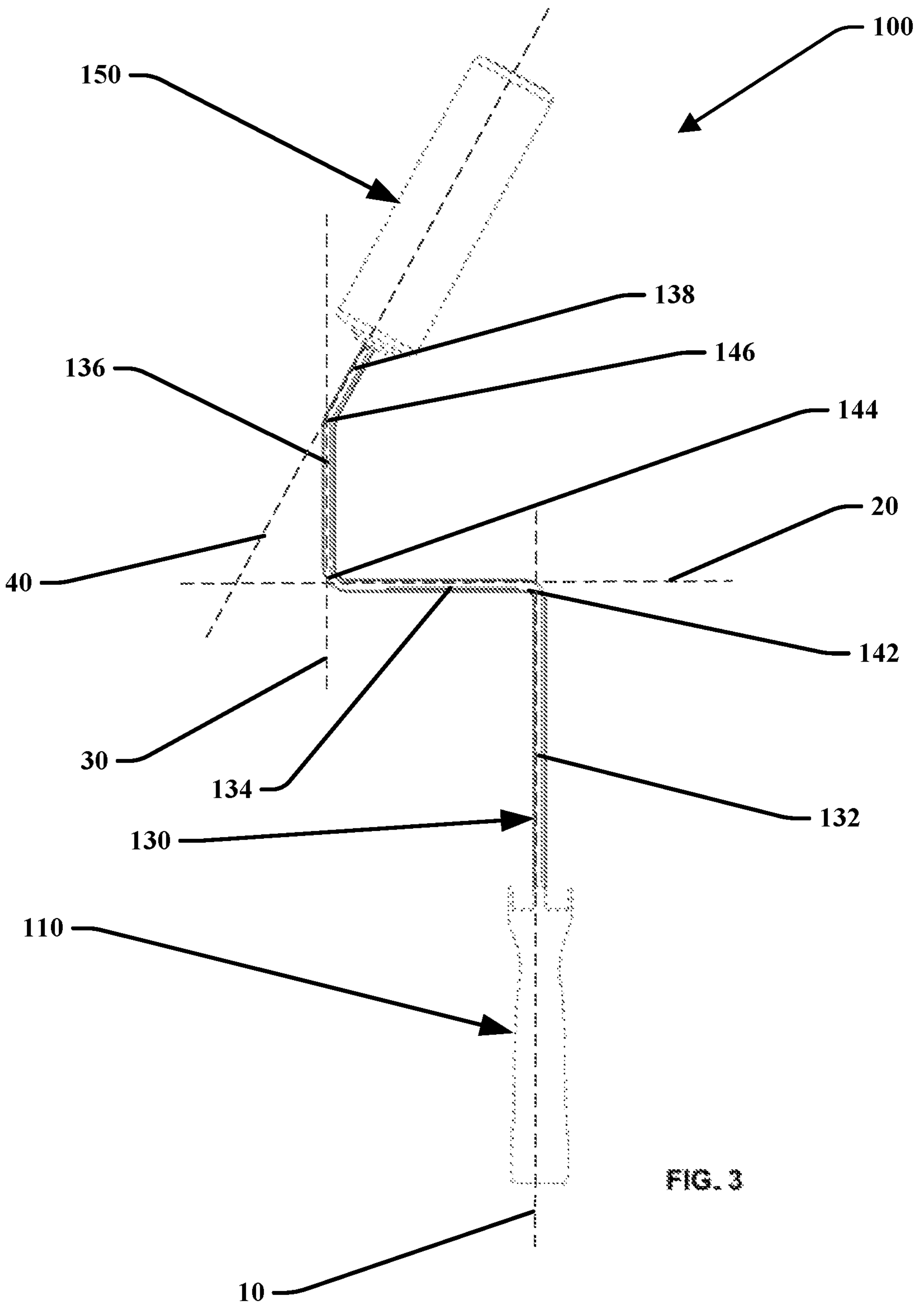
FIG. 3 is a rear plan view of the paint roller having a bent frame of FIG. 1.

The frame 130 may include a bent orientation 140 that includes a plurality of straight sections and bent sections at various angles along a common plane. The frame 130 may be made of a unitary piece of material such as a metal or alloy rod that has been bent to form the device described herein, wherein the plurality of straight sections and bent sections are positioned along the unitary material. The plurality of straight sections may include a first leg 132, a second leg, 134, a third leg 136, and a fourth leg 138. The first leg 132 may be attached to and extend from the second leg 134. The second leg 134 may be attached to and extend from the third leg 136. The third leg 136 may be attached to and extend from the fourth leg 138. The first leg 132 may include an elongated portion that attaches to or extends from the handle 110. As illustrated by FIG. 2, the first leg 132 may extend straight from the handle (180°) so that the first leg 132 and the handle 110 are aligned in a relatively straight orientation along a first axis 10. In an embodiment, the first leg 132 may extend from the handle along the common first axis 10 or at an angle, such as between 160° to 200°. A first bend 142 may exist between the first leg 132 and the second leg 134 and have a radius of curvature of about 90°, see FIGS. 2-3. In an embodiment, the first bend 142 may have a radius of curvature of about 70° to 110°. The first bend 142 may direct the first leg 132 into the second leg 134 of the frame, where the second leg 134 is aligned along a second axis 20. A second bend 144 may have a radius of curvature of about 90° in a direction that directs the second leg 134 to a third leg 136, where the third leg 136 is aligned along a third axis 30. In an embodiment, the second bend 144 may have a radius of curvature of about 70° to 110°. The third leg 136 and third axis 30 may be aligned in a substantially parallel configuration relative to the first leg 132, handle 110, and first axis 10. The second leg 134 and second axis 20 may be aligned in a substantially perpendicular configuration relative to the first leg 132, handle 110, and first axis 10 along one end and may also be aligned in a substantially perpendicular configuration relative to the third leg 136 and third axis 30 along an opposite end.

A third bend 146 may have a radius of curvature that is smaller than the radius of curvature of the first bend 142 and the second bend 144. The third bend 146 may direct the third leg 136 into the fourth leg 138 of the frame 130, where the fourth leg 138 is aligned along a fourth axis 40. In an embodiment, the radius of curvature of the third bend 146 may be less than about 45°, may be between about 20° and 40°, between about 25° and 30°, or may be about 25°. The fourth leg 138 of the frame 130 may extend from the third leg 136 having a radius of curvature of the third bend 146 and include an elongated portion that attaches to or extends into the roller cage 120, see FIG. 13 and frame portion 122. The roller cage 120 is configured to receive and support the roller cover 150 having a rotatable connection with the fourth leg 138 of the frame 130. The roller cage 120 and the roller cover 150 may be configured to rotate concentrically about the fourth axis 40.

In an embodiment, the first leg 132, second leg 134, and third leg 136 may decrease sequentially in length. In another embodiment, the second leg 134 and third leg 136 may be about the same size, or have one leg slightly larger or smaller than the other. In an embodiment, the first leg 132 may be the longest leg in length and the fourth leg 138 may be the second longest leg in length (when including the frame portion 122 that extends into the roller cage 120).

In an embodiment, the first leg 132 may have a first length in the range of about 5 inches to 7 inches as it extends from the handle 110. The first leg 132 may have a length of about 6 inches. In an embodiment, the second leg 134 may have a second length in the range of about 3 inches to 5 inches, or may be between about 3.5 inches to about 4 inches. In an embodiment, the third leg 136 may have a third length in the range of about 2 inches to 3 inches or may be between about 2.5 inches to about 3 inches. In an embodiment, the fourth leg 138 may have a fourth length of about 5 inches to 7 inches as it extends at least partially through the roller cage 120 and roller cover 150 (frame portion 122). The fourth leg 138 may have a length of about 6 inches. However, it is noted that the disclosure contemplates any size length for use with paint tools of various sizes and configurations.

Notably, the roller cover 150 may be attached to the roller cage 120 on the fourth leg 138 in such a way that the roller cover 150 extends past an end of the fourth leg 138 when attached. In this manner, the end of the fourth leg 138 may be generally adjacent to, but recessed from, an end of the roller cover 150 when it is attached to the roller cage 120.

It is noted that any of these above ranges corresponding with the associated leg may be combined with any of the ranges corresponding to the associated other legs to describe a myriad of different lengths of the legs and configurations of the frame 130. In an embodiment, the frame, including the four legs 132, 134, 136, 138 and three bends 142, 144, 146 may be formed from a singular or continuous metal rod. In an embodiment, each or some of the legs may be separately attachable and removable such that different legs and different bends may be utilized by the user. In an example, a straight adapter or an adapter with one or two bends may be attached to the handle 110 or the first leg 132. In another example, a straight adapter or an adapter with one or two bends may be attached to the third leg 136 or the fourth leg 138, and comprise a roller cage 120.

Figure 4:
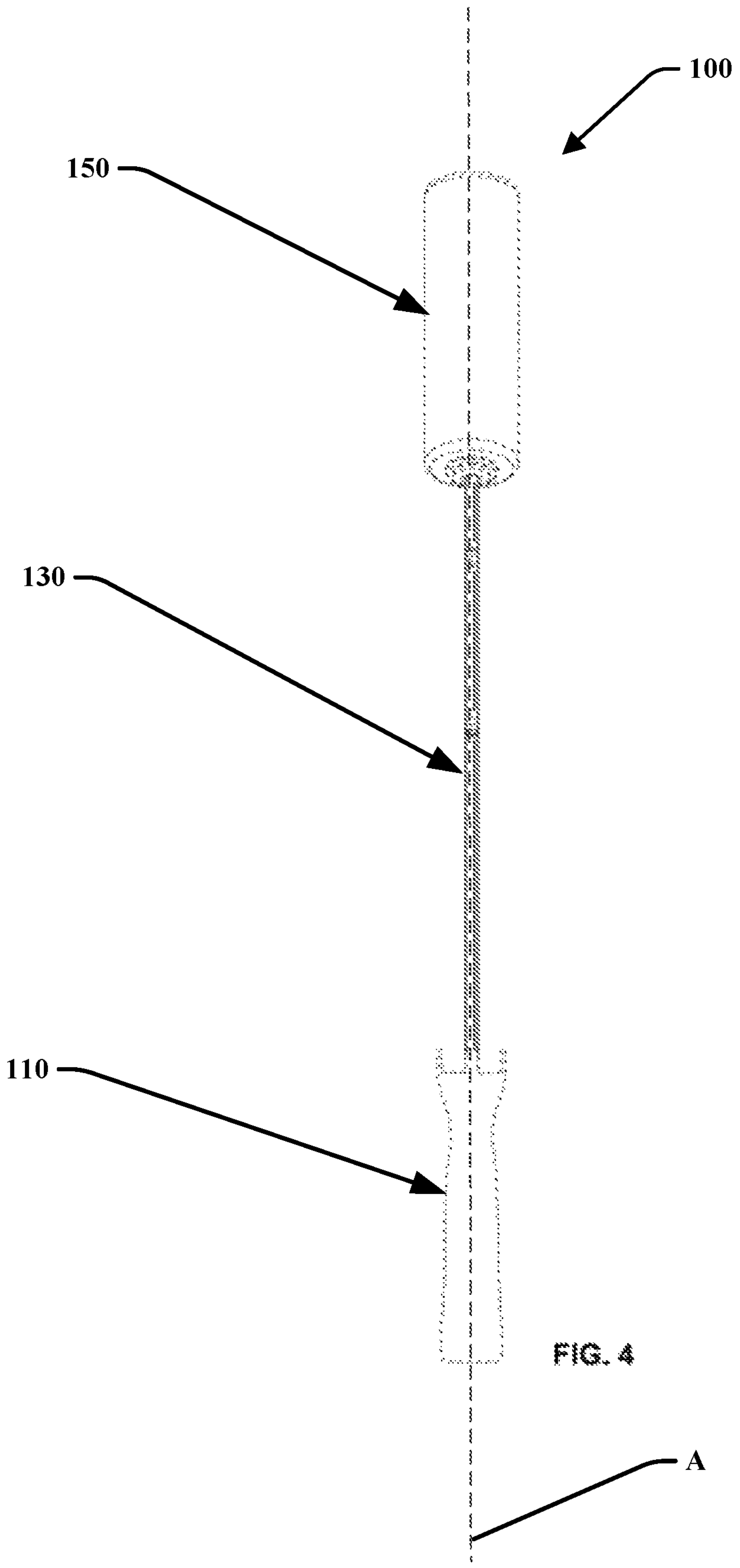
FIG. 4 is a first side view of the paint roller having a bent frame of FIG. 1.
Figure 5:
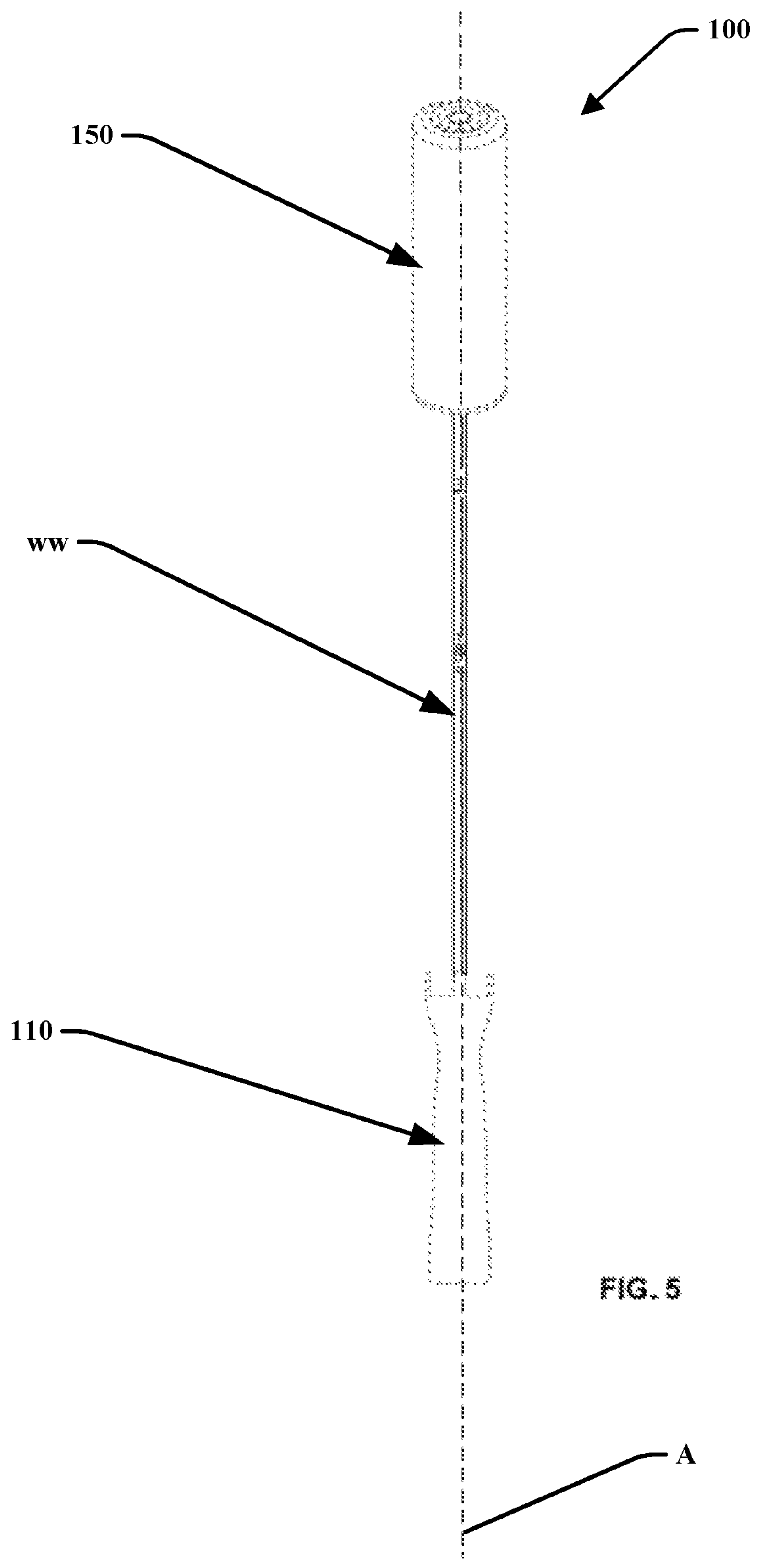
FIG. 5 is a second side view of the paint roller having a bent frame of FIG. 1.
Figure 6:
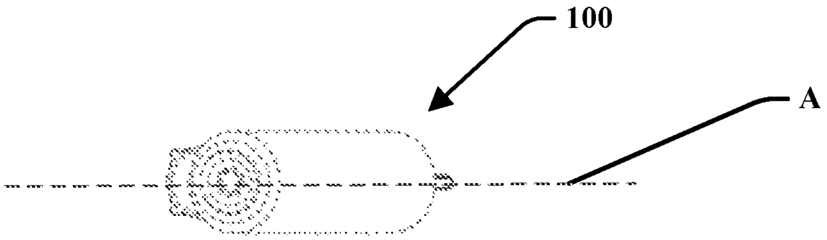
FIG. 6 is a top view of the paint roller having a bent frame of FIG. 1.
Figure 7:
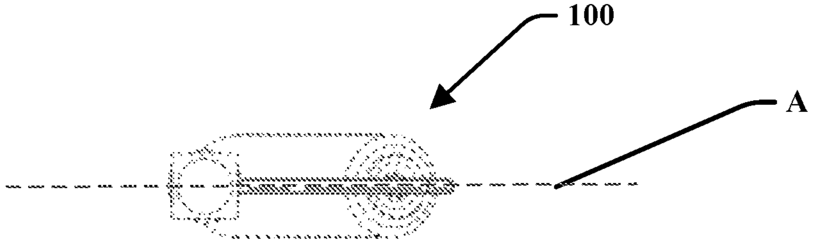
FIG. 7 is a bottom view of the paint roller having a bent frame of FIG. 1.
Figure 8:
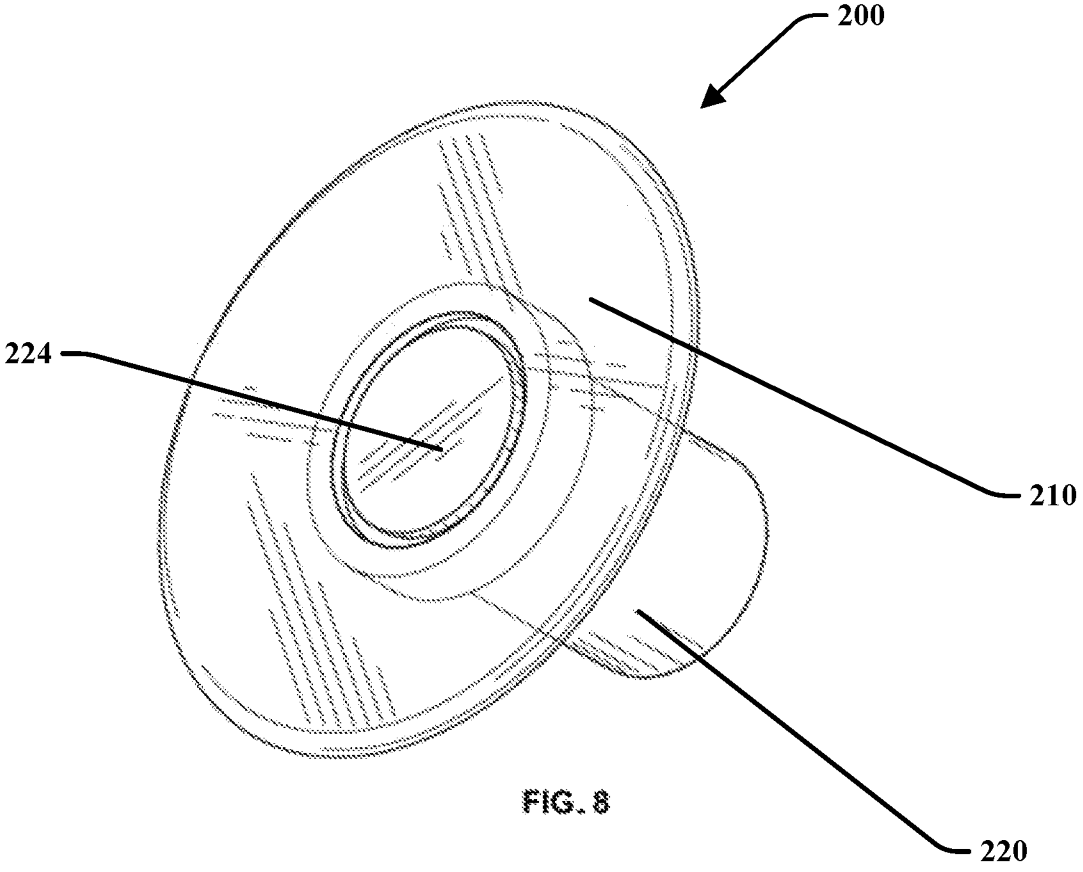
FIG. 8 is a perspective view of a shield for a paint roller.
Figure 9:
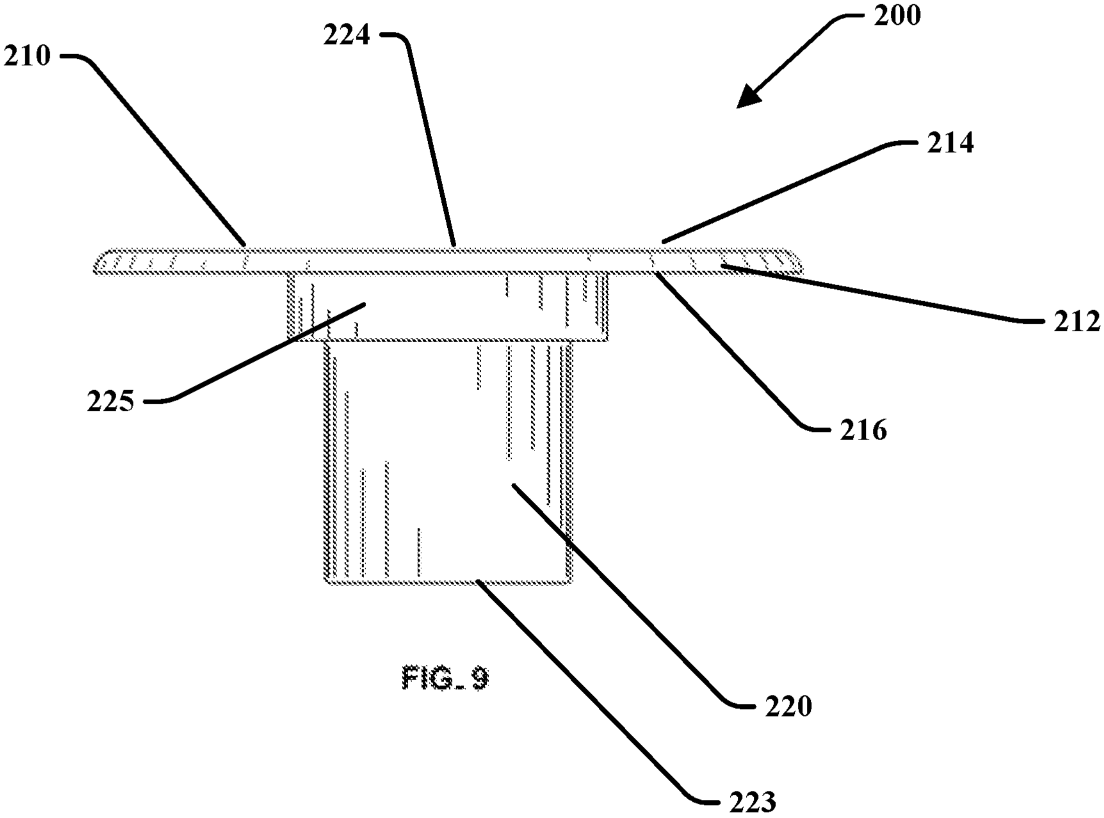
FIG. 9 is a side view of the shield for a paint roller of FIG. 8.
Figure 10:
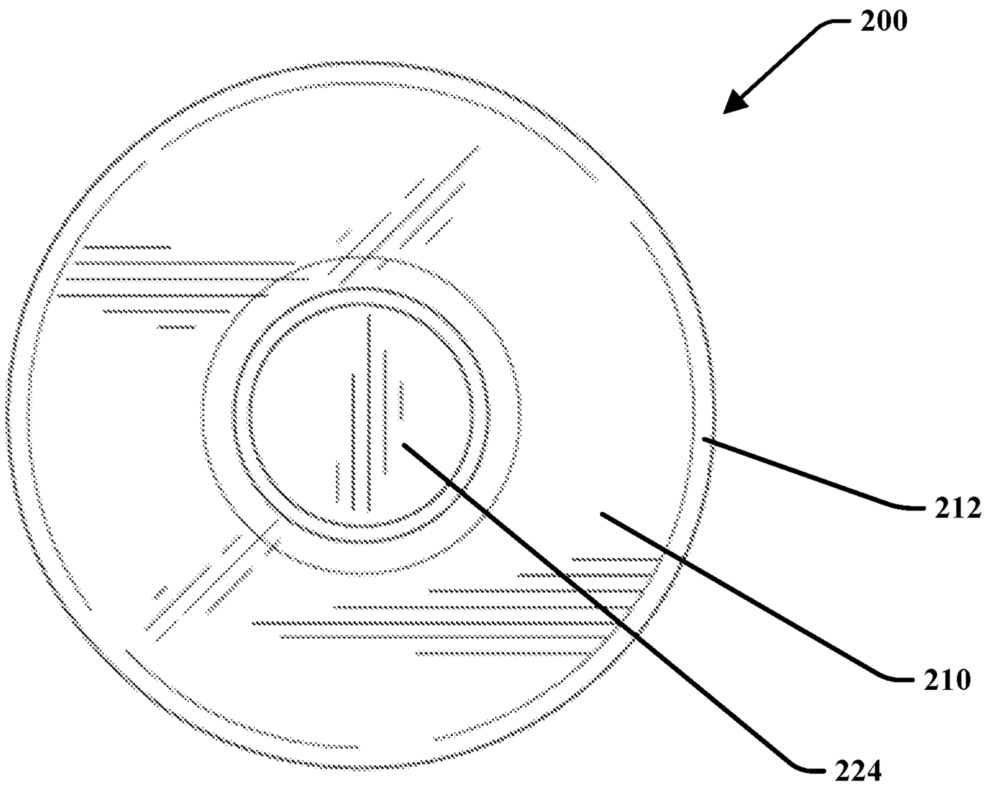
FIG. 10 is a top view of the shield for a paint roller of FIG. 8.
Figure 11:
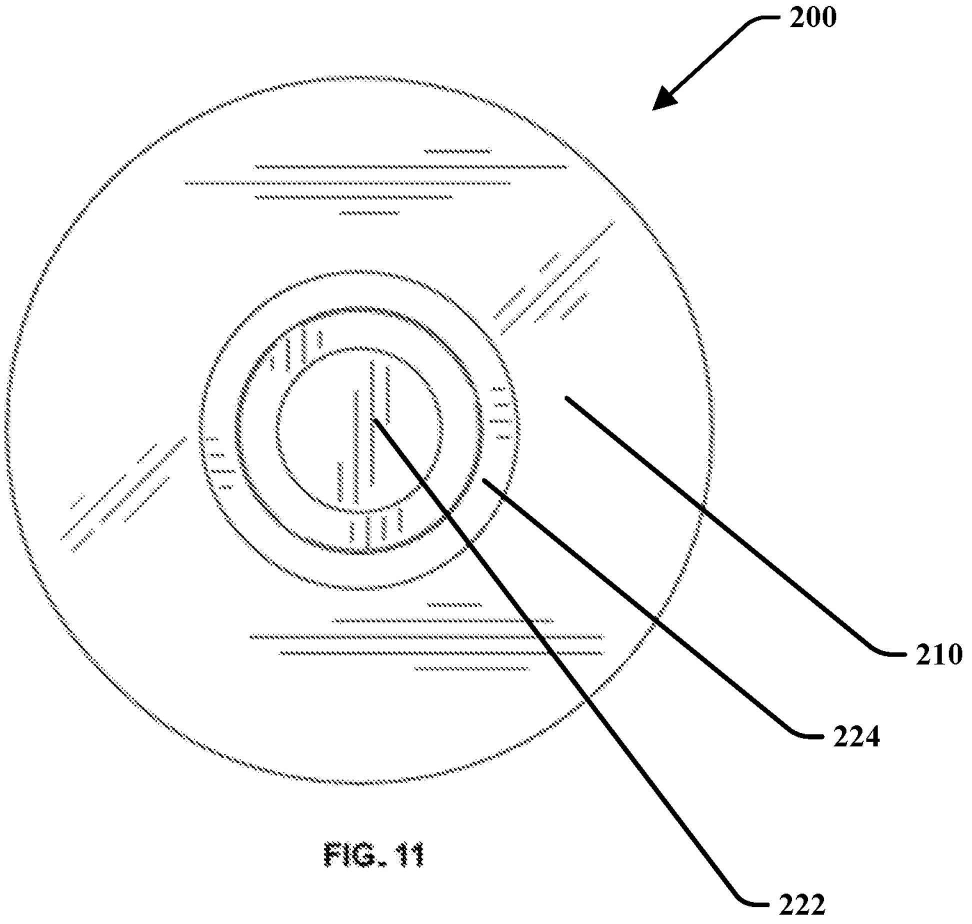
FIG. 11 is a bottom view of the shield for a paint roller FIG. 8.

In an embodiment, the bends 142, 144, 146 and associated legs 132, 134, 136, 138 of the frame 130 may be positioned in the same plane of orientation, see for example common plane (A) shown from the sides in FIGS. 4-5 and from the top/bottom in FIGS. 6-7. As seen in FIGS. 4-5 and FIGS. 6-7, the frame 130 and all legs and bends thereon (e.g. four legs 132, 134, 136, 138 and three bends 142, 144, 146) is encompassed on common plane (A) and appears from these views as a straight line as any bends (three bends e.g. 142, 144, 146) can only be seen in FIGS. 1-3. In another embodiment, one or more of the three bends 142, 144, 146 (but not all) may be positioned along a first plane (x-plane) and one of more of the three bends 142, 144, 146 (but not all) may be directed into one or more adjacent planes (such as a y-plane or z-plane). For example, the first two bends 142, 144 and associated three legs 132, 134, 136 of the frame may be positioned along a common plane (x-plane), and the third bend 146 may direct the fourth leg 138 of the frame 130 into an adjacent plane (such as a y-plane or z-plane). It is noted that other configurations may also be used wherein different bends are not only utilized to redirect the angle of the frame 130 in an angle within the same plane, but also at a different 3-D angle in a different plane.

The bent configuration of the frame 130 may enable precise application and streamlined angles for painting a junction between a surface that is intended to be painted and a surface that is not intended to be painted when the two surfaces are at an angle from each other, for example, when two walls or a ceiling and a wall are at a generally perpendicular angle. The bent configuration of the frame 130 may further allow extended reach of the user when painting areas that are at a greater height or in a more difficult to reach area, such as by a ceiling, between beams, next to molding and doors or cabinetry, and the like. Although the described embodiments herein describe a frame 130 having four legs 132, 134, 136, 138 and three bends 142, 144, 146, it is noted that the frame may include any number of bends, including, for example one, two, three, four, five, six, seven, and the like bends and the frame may include any number of legs, for example, two, three, four, five, six, seven, eight and the like legs.

Turning to FIGS. 8-13, a shield 200 may be selectively attachable to an end of the paint roller 100. The shield 200 may include a plate 210 and a stem 220. The shield 200 may provide a protective barrier between the roller cover 150, capable of holding and applying paint, and an edge of the surface intended to be painted. For example, the shield 200 may serve as a low-profile guide for edging the junction between a surface that is intended to be painted and a surface that is intended not to be painted, e.g., between a wall and the ceiling or another adjacent wall. In an embodiment, the shield 200 may press against an adjacent surface, such as a ceiling or wall, that is substantially perpendicular to the surface being painted, and may prevent paint and/or the roller cover 150 from contacting that adjacent surface. In an embodiment, an edge 212 of the shield 200 may come substantially close to (e.g. within 0.5 cm) of the surface being painted. The shield 200 may be configured to attach to any paint roller, including paint roller 100 or other paint rollers already existing on the market or that will be later introduced.

The shield 200 may comprise any suitable material including, but not limited to, metals, alloys, plastics and polymers such as polycarbonate; acrylonitrile butadiene styrene (ABS) (C8H8C4H6C3H3N); polycarbonate or acrylonitrile butadiene styrene alloys (PC-ABS); polybutylene terephthalate (PBT); polyethylene terephthalate (PET); polyphenylene oxide (PPO); polyphenylene sulfide (PPS); polyphenylene ether; modified polyphenylene ether containing polystyrene; liquid crystal polymers; polystyrene; styrene-acrylonitrile copolymer; rubber-reinforced polystyrene; poly ether ketone (PEEK); acrylic resins such as polymers and copolymers of alkyl esters of acrylic and methacrylic acid styrene-methyl methacrylate copolymer; styrene-methyl methacrylate-butadiene copolymer; polymethyl methacrylate; methyl methacrylate-styrene copolymer; polyvinyl acetate; polysulfone; polyether sulfone; polyether imide; polyarylate; polyamideimide; polyvinyl chloride; vinyl chloride-ethylene copolymer; vinyl chloride-vinyl acetate copolymer; polyimides, polyamides; polyolefins such as polyethylene; ultra high molecular weight polyethylene; high density polyethylene; linear low density polyethylene; polyethylene napthalate; polyethylene terephthalate; polypropylene; chlorinated polyethylene; ethylene acrylic acid copolymers; polyamides, for example, nylon 6, nylon 6,6, and the like; phenylene oxide resins; phenylene sulfide resins; polyoxymethylenes; polyesters; polyvinyl chloride; vinylidene chloride/vinyl chloride resins; and vinyl aromatic resins such as polystyrene; poly(vinylnaphthalene); poly(vinyltoluene); polyimides; polyaryletheretherketone; polyphthalamide; polyetheretherketones; polyaryletherketone, and combinations of two or more thereof.

Other examples of suitable materials may include, but are not limited to, rubber-like polymers including, polyisoprene, butadiene rubbers, styrene-butadiene copolymers, such as Buna S and SBR, cis-polybutadiene, cis-polyisoprene, nitrile elastomers or NBR rubbers (also known as acrylonitrile and butadiene copolymers) such as Buna N, butyl rubbers including copolymers of isobutylene and isoprene, ethylene-propylene monomer (EDM), ethylene-propylene-diene monomer (EPDM), neoprene (polychloroprene), polysulfide rubbers (thiokols), ethylene-propylene rubbers (RPDM), urethane elastomers, and silicone rubbers such as dimethysilanediol polymers and polydimethyl siloxane, fluoroelastomer, polyacrylate elastomer, polyethylene (chlorinated, chlorosulfonated), styrene-isoprene-styrene (SIS), styrene-butadiene-styrene (SBS), EPDM-polypropylene blend, and combinations of two or more thereof.

The shape of the plate 210 may generally correspond to the shape of the roller cover 150 or roller cage 120. In an embodiment, the plate 210 may have a generally circular shape. The size of the plate 210 may generally correspond to the size of the roller cover 150 or a size that is less than the size of the roller cover 150. In an embodiment, the plate 210 may have a circumference that is less than an outer circumference 154 of the roller cover 150 and that is greater than an inner circumference 156 of the roller cover 150. The plate 210 may be sized and shaped so as to generally cover a hollow core 152 of the roller cover 150, but to not extend radially beyond the surface of the roller cover 150. The stem 220 may be sized and shaped so as to generally fit into or mate with the hollow core 152 of the roller cover 150. In an embodiment, the roller cover 150 may compress as it applies paint onto a surface and the circumference of the plate 210 may be slightly less than this compressed circumference (such as within 0.25 inches or less) of the roller cover 150 such that an edge 212 of the plate 210 may come substantially close to or even contact the surface being painted or the junction between the surface being painted and the surface not being painted. In an embodiment, the edge 212 of the plate 210 may be rounded, angled, tapered, or the edge 212 of the plate 200 may be flat, see FIG. 9. The shield 200 or the plate 210 may prevent paint from getting into the hollow core 152 and provide a protective guide in respect to unpainted surfaces as the roller cover 150 is rolled and paint applied to a surface.

It is noted that various different sizes and shapes of a roller cover 150 may exist, including roller covers having diameters that are generally associated with various sizes of roller covers 150. As a result, multiple shields 200 may be provided having varying diameters so as to accommodate a user's preference and choice of a particularly sized roller cover 150. In an embodiment, the plate 210 may be generally planar. In an embodiment, the plate 210 may include an outer surface 214 that is entirely flush or continuous, i.e. comprising no beveled edges or cut-outs. Having a flush or continuous outer surface 214 surface may serve to contain the paint to the paint roller and away from the outer surface 214 of the plate 210 and the hollow core 152 of the roller cover 150. The plate 210 includes an inner surface 216 opposite from the outer surface 214.

The stem 220 may extend substantially perpendicularly from the plate 210. The stem 220 may generally extend from the inner surface 216 about a central portion of the plate 210 opposite from the outer surface 214. In an embodiment, the stem 220 may be cylindrically shaped that defines a cavity 222 with an open proximal end 223. The stem 220 may have a length that is less than about 1 inch and more particularly about 0.5 inches. The stem 220 may be configured to attach the shield 200 to the paint roller 100. In an embodiment, the shield 200 may be removeably attached to the paint roller 100. In an embodiment, the cavity 222 is configured to receive, at least partially, an end 126 of the frame 130. It is noted that the end 126 of the frame 130 may be an end of the fourth leg 138 that traverses through the roller cage 120 at a frame portion 122. The end 126 may extend from the roller cage 120 as frame portion 124 to an end 126, where all of the frame portion 122, frame portion 124, end 126, and roller cage 120 may be covered by the selective attachment of the roller cover 150. The stem 220 may fit within an aperture along an end of the roller cover 150 (such as the hollow core 152). In an embodiment, a corresponding frame portion 124 of the frame 130 may be an extension of the rolling cage 120 or may be a part of the frame 130 that extends through the roller cage 120, see frame portion 122, and outside of the roller cage, as frame portion 124 in FIG. 13.

Figure 14:
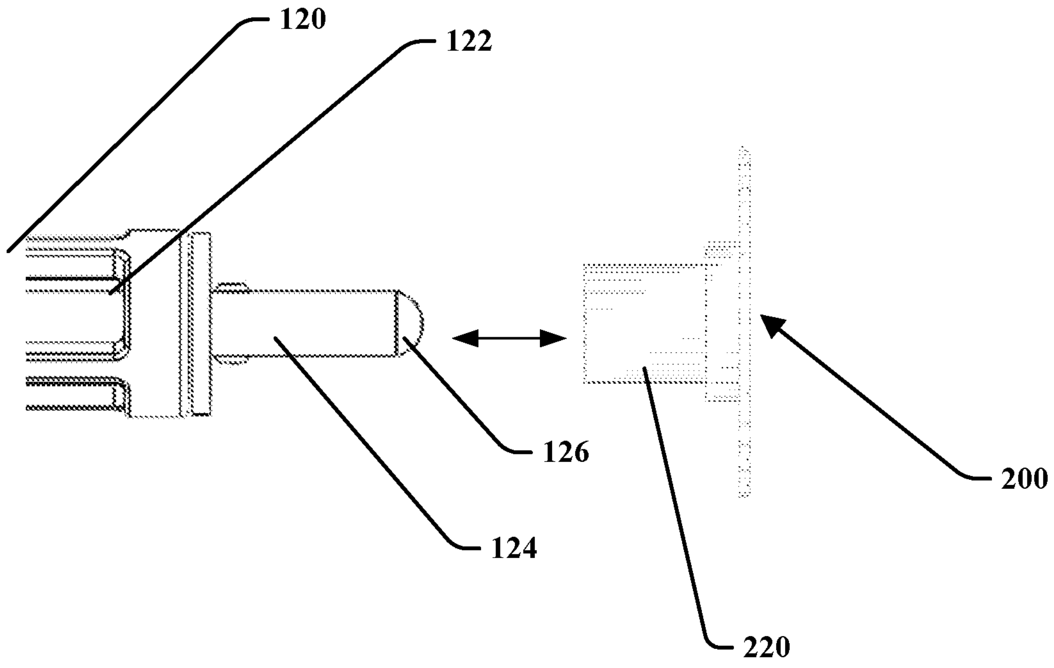
FIG. 14 is a side exploded view of a portion of a paint roller frame and a shield according to the present disclosure.

In an embodiment, the mating or attachment between frame portion 124/end 126 and cavity 222 may be facilitated by a magnet 224. The magnet 224 may be positioned along a center portion of the shield 200 and be generally aligned with the stem 220. In an embodiment, the frame portion 126 may be at least partially received within the cavity 222 through the proximal end 223 such that the end 126 of the frame 130 may be magnetically attracted to the magnet 224. FIG. 14 illustrates a side view of the shield separated from the end 126 of the frame 130 and is illustrated without the roller cover 150. However, when the shield is attached to the roller 100 with a roller cover 150 as illustrated by FIG. 12, the end 126 may be spaced from or received in the cavity 222 to selectively attach the shield 200 to the paint roller 100.

In an embodiment, the magnet 224 may be generally circular in shape and have a flat front side generally aligned with the plate 210 and be positioned along a junction of the stem 220 and the plate 210. The magnet 224 may be enclosed in the stem 220 and in the material comprising the shield 220, such as a plastic or rubber polymer as described herein. The frame portion 124 of the paint roller 120 may be made of a metal that interacts and attaches to the magnet 224, such as a ferromagnetic, paramagnetic, or diamagnetic metal. See FIG. 14. The magnet 224 may attach or have a magnetic attraction to the end 126 of the frame portion 124 when the stem 220 is inserted into the aperture of the roller cover 150. The magnet 224 may be positioned in a recess or cavity formed in the outer surface 214 of the plate 210 such that the magnet 224 may be flush with the outer surface 214. The recess may shaped to receive the magnet 224 wherein the recess is maintained in an annular shoulder portion 225 of the shield 200 that extends from the inner surface 216 of the plate 210. The magnet 224 may be attached within the recess with adhesive or otherwise friction fit therein. The stem 220, annular shoulder portion 225, magnet 224, and plate 210 may each be circularly shaped and be concentrically aligned along a common axis. The stem 220, and exterior of the magnet portion 224 and cavity portion 222 thereof, may have a smaller diameter than the plate 210 and the inner diameter 256 of the roller cover so as to facilitate insertion of the stem 220, i.e. magnet portion 224 and/or cavity portion 222 thereof, into the hollow core 152 of the roller cover 150 to attach to the end 126 of the frame portion 124 within the roller cover 150. The exterior of the magnet portion 224 and the cavity portion 222 of the stem 220 may have the same or different diameters. When attached, the inner surface 216 may abut against the roller cover 150 and the shield 200 may freely rotate about its concentric axis with the roller cover when applying paint to the surface.

The magnetic connection between the shield 200 and the paint roller 100 (or other roller device) may facilitate ease in attachment, removal, and replacement of the shield as desired by the user. For example, the shield may be removed when a larger, non-edging area or a surface is painted, when a roller cover is attached or removed for cleaning or to use a different size or paint color, and the like. The magnetic connection may further ensure that the integrity of the mating portions are maintained throughout numerous uses as there may not be threading or other pressure fitting that may result in wear and tear upon continual removal and attachment of the shield 200 to the paint roller 100. Although the connection between the shield 200 and the paint roller 100 is described as a magnetic connection, it is noted that any other connection may be used in addition to or instead of the magnetic connection, including interlocking components, pressure fit, threaded fit, adhesive, and the like. The magnetic connection between the shield 200 and the end 126 of the frame 130 may allow for the roller cover 150 and shield 200 to rotate while a user applies paint to a surface from the roller cover 150.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof.

What is claimed is:

1. A shield configured to attach to a paint roller, the shield comprising:
- a circular and planar plate;
- a stem extending from the center of the plate, including a magnet and a cavity;
- wherein the shield is configured to selectively and magnetically attach to and receive an end of a frame of a paint roller in the cavity of the stem, and prevent paint from transferring onto an adjacent surface.

2. The shield of claim 1, wherein the shield is configured to selectively and magnetically attach to the frame of a paint roller.

3. The shield of claim 1, wherein the plate comprises a surface that is continuous and does not include any beveled edges or cut-outs.

4. The shield of claim 1, wherein the plate comprises a rounded edge.

5. The shield of claim 1, wherein the plate comprises a circumference that is less than an outer circumference of a roller cover.

6. The shield of claim 1, wherein the stem comprises a circumference that is less than an inner circumference of a roller cover.

* * * * *